United States Patent [19]

Le Gallo

[11] Patent Number: 5,274,765
[45] Date of Patent: Dec. 28, 1993

[54] MULTIFUNCTIONAL COUPLER FOR CONNECTING A CENTRAL PROCESSING UNIT OF A COMPUTER TO ONE OR MORE PERIPHERAL DEVICES

[75] Inventor: Remy Le Gallo, Le Chesnay, France

[73] Assignee: Bull S.A, Paris, France

[21] Appl. No.: 510,275

[22] Filed: Apr. 17, 1990

[30] Foreign Application Priority Data

Apr. 17, 1989 [FR] France ............... 89 05065

[51] Int. Cl.$^5$ .................. G06F 13/12; G06F 12/02
[52] U.S. Cl. .................. 395/275; 395/400; 364/DIG. 2; 364/927.99; 364/929.4; 364/955
[58] Field of Search .............. 364/DIG. 1, DIG. 2; 395/275, 400

[56] References Cited

U.S. PATENT DOCUMENTS

4,079,452 3/1978 Larson et al. .............. 364/200
4,964,038 10/1990 Louis et al. .............. 364/200

*Primary Examiner*—Gareth D. Shaw
*Assistant Examiner*—Kakali Chaki
*Attorney, Agent, or Firm*—Weingarten, Schurgin, Gagnebin & Hayes

[57] ABSTRACT

A multifunctional coupler for connecting a central processing unit of a computer to one or more peripheral devices and for storing at least one portion of an application microprogram that is operative to control transfer of data between a peripheral and the CPU. The coupler includes a mother-board with at least a first and second interface for connecting an output bus of the CPU to at least first and second daughter-boards, respectively. The mother-board also includes a control and command microprocessor that is connected to both the first and second interfaces, a RAM and a first ROM, all connected to an output bus of the microprocessor. The daughter-boards each include a second ROM for storing an application microprogram that includes a first program segment common to all application microprograms run by the microprocessor, that is read from the first ROM, and a second segment that is read from a second ROM, the second segment being specific to a particular application executed by a peripheral.

7 Claims, 4 Drawing Sheets

MULTIFUNCTIONAL COUPLER FOR CONNECTING A CENTRAL PROCESSING UNIT OF A COMPUTER TO ONE OR MORE PERIPHERAL DEVICES

FIELD OF THE INVENTION

This invention relates to an apparatus for connecting the CPU of a computer to its various peripherals, and particularly to an apparatus for controlling data transfer between each connected peripheral and the CPU, regardless of the type of application to be performed.

BACKGROUND OF THE INVENTION

In general, a computer system enables a human user to perform data storage, data processing and data exchange with the external environment. There are various computer systems, including mainframe computers, minicomputers, and personal computers.

All computer systems, regardless of their type, perform certain basic functions. These basic functions are performed by a variety of hardware and software components that make up a computer system. A typical computer includes a central processing unit (CPU) and various peripherals, including magnetic peripherals, such as disk memories or tape drives, and other peripherals called input-output devices for exchanging data with the environment, including printers and terminals, such as the Minitel, for example.

A CPU consists of a central processor and a local main memory connected to the processor, as well as an input-output processor to control exchange of data between the main memory and the various peripherals.

Transfer of data between the CPU and the peripherals is implemented by a coupler connected to the output bus of the CPU and to the peripheral to be used.

Data processing and other tasks handled by computers include setting up payroll, looking up numbers in a telephone directory, reserving seats on an airplane or train, etc. Each type of processing and each task to be performed defines an application. The computer uses an application program to perform the associated application. The central processor in the computer CPU executes a set of instructions derived from an application program. These instructions and the data they manipulate are typically stored in the main memory. The processor executes each of the instructions in the program.

To understand better what an application is, let us consider, for example, airline seat reservations. Each time a passenger comes to the window, the airline employee or travel agent uses a terminal with a keyboard and screen connected to a computer. He asks the computer to suggest a given flight, and a seat for the passenger on the flight. When the computer presents an acceptable selection via the screen at the terminal, the employee makes the reservation. The flight schedules of different airlines, as well as lists of available seats and occupied seats for each flight, are generally stored in a secondary computer memory, a disk memory for example. The program that checks and updates the passenger lists in the computer is called a user program or application program, as mentioned above. The list of flights and their respective characteristics, and the associated seating lists are stored in a portion of the disk memory, referred to as a file.

Working at a terminal, one can perform many different applications: searching for a phone number in a telephone directory, booking seats at a performance, consulting a database, etc. In addition, the terminal may be capable of performing only one or a limited number of applications; the application may differ from one terminal to another. Performing airline seat reservations or looking up telephone numbers can be considered administrative applications. There are also scientific and industrial applications, however, for automatically monitoring production processes.

There are one or more couplers between a computer CPU and its various terminals for transmitting data therebetween. During transmission, the consistency of the data and the formats of the various screens of transmitted information is checked. In other words, a check is made to determine whether the formats of these screens match the transmission mode for each terminal. As is known, a screen of information is the elementary block of information transmitted by a terminal, regardless of its structure. A screen of information includes a start and an end message, synchronization signals for the clock, the address of the sending terminal, the volume of data, the volume of useful data, etc. The coupler then verifies whether each screen of information is transmitted in the appropriate format; the format must conform to the transmission protocol controlling the dialogue between the terminal and the CPU. The protocol defines the rules for access to each terminal. The coupler must also transmit this information without error and must regenerate signals whose amplitude is weakened during transmission between each terminal and the CPU.

Figure 1:
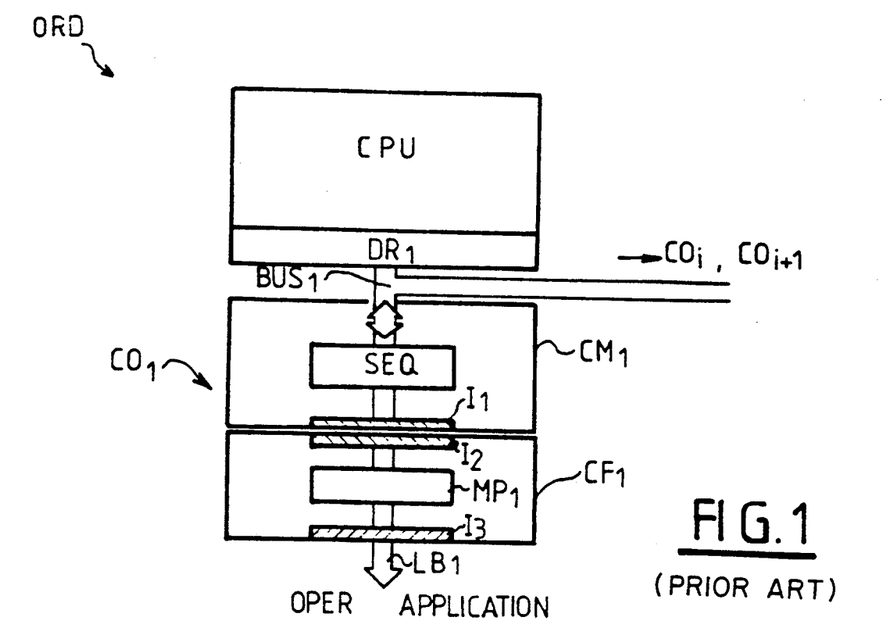
FIG. 1 is a block diagram of a first type of coupler according to the prior art.

With reference to FIG. 1, two main types of couplers are in current use, for example, in the DPS 6 computer made by Société Bull S.A. The first type of coupler CO consists of a mother-board $CM_1$ and a daughter-board $CF_1$. The mother-board is connected to the CPU of the computer ORD through a bus $BUS_1$ in which the data bits are transmitted in parallel. The CPU stores an application program to be executed in conjunction with a peripheral OPER (not shown).

FIG. 1 shows the interface between the application program stored in the central memory of the CPU and the coupler $CO_1$, namely $DR_1$, which is actually a software module called a driver, and is described in the technical manuals for the DPS 6 computer.

The mother-board $CM_1$ is likewise connected through the parallel bus $BUS_1$ to other couplers, with a structure identical to $CO_1$, namely $CO_1$, $CO_{i+1}$, etc. The mother-board $CM_1$ includes an interface $I_1$, and the daughter-board $CF_1$ includes an interface $I_2$ that, when joined together, enable signals to travel between the mother-board $CM_1$ and the daughter-board $CF_1$. Daughter-board $CF_1$ likewise includes an interface $I_3$ that allows signals to travel between the daughter-board $CF_1$ and an associated peripheral OPER through a parallel bus $LB_1$. The parallel bus $LB_1$ can transmit eight bits in parallel, for example. When joined together, interfaces $I_1$ and $I_2$ are operative to electrically couple conductors on the mother-board with conductors on the daughter-board.

The interface $I_3$ can be, for example, an optoelectronic coupler of the HP2602 HCL type with a 10 MHz passband filter. This type of optoelectronic coupler communicates signals between the peripheral OPER and the various elements of the computer, while electrically isolating the peripheral OPER from the various elements that make up the computer.

The mother-board $CM_1$ is a non-intelligent board sold under the commercial designation GPI (General Purpose Interface) with the DPS 6 computer. It consists mainly of a sequencer SEQ for direct memory access DMA, this direct access procedure being well known to one skilled in the art, and described in the technical user manuals for the DPS 6 computer.

The daughter-board $CF_1$ includes a microprocessor $MP_1$, for example the Motorola 68010. In this configuration, the microprogram includes a set of microinstructions that transfer information to and from a peripheral OPER and the CPU, the transfer occurring in a consistent fashion and without any distortion of the various signals representing the bits of information. The microprogram is stored in the local memory of the microprocessor $MP_1$, and will herein be referred to as an application microprogram. In addition, in the event of any interruption of data exchange between the CPU and the peripheral OPER, the interruption is managed by the program in the CPU. An interruption can arise, for example, when the CPU must manage several application programs in conjunction with the various peripherals simultaneously. An application program may be interrupted at any time to permit processing required by another application program.

In the first type of coupler, for each new application, both the daughter-board $CF_1$ and the program stored in the CPU must be changed. This approach is insufficiently flexible and relatively complicated.

Figure 2:
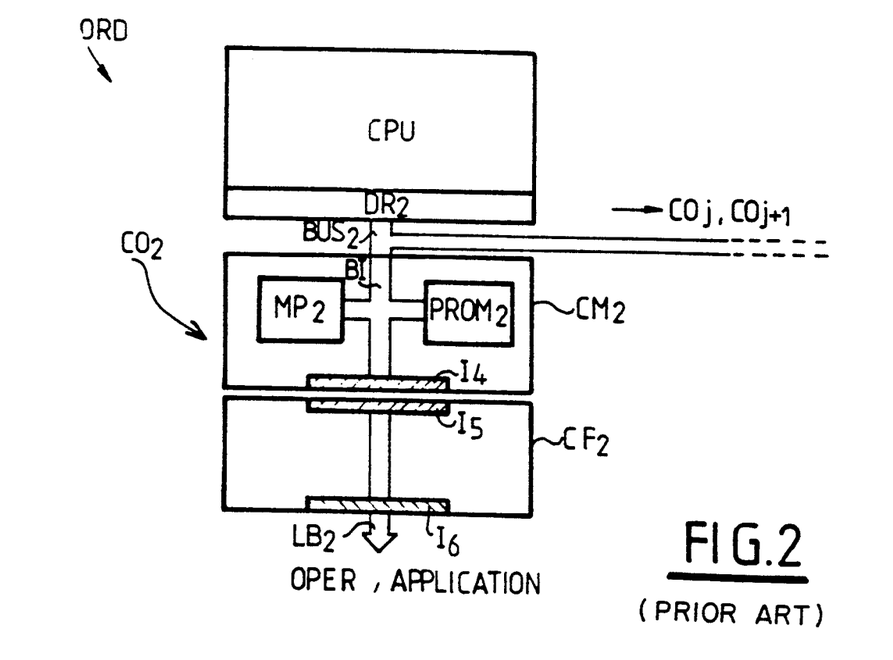
FIG. 2 is a block diagram of a second type of coupler according to the prior art.

The second type of coupler $CO_2$, is shown in FIG. 2 and bears the commercial designation MDC (Multi Device Controller) for the DPS 6 computer, as mentioned above. The CPU in FIG. 2 is similar to that shown in FIG. 1, with a software interface $DR_2$, similar to interface $DR_1$, and a coupler $CO_2$, including a mother-board $CM_2$ and a daughter-board $CF_2$. The mother-board $CM_2$ is connected to the CPU through a parallel bus $BUS_2$ analogous to the $BUS_1$. The CPU is connected through the bus $BUS_2$ to other couplers, with structures analogous to the coupler $CO_2$, namely $CO_j$, $CO_{j+1}$, etc.

The mother-board $CM_2$ includes an interface $I_4$ similar to interface I of mother-board $CM_1$ in FIG. 1, while the daughter-board $CF_2$ comprises two interfaces $I_5$ and $I_6$ analogous to interfaces $I_2$ and $I_3$ of the daughter-board $CF_1$ in FIG. 1. The role of the interfaces $I_4$, $I_5$, and $I_6$ is analogous to the role of the interfaces $I_1$, $I_2$, and $I_3$ shown in FIG. 1.

The daughter-board $CF_2$ is connected to peripheral OPER through parallel bus $LB_2$ similar to the bus $LB_1$. The daughter-board $CF_2$ is a non-intelligent board and stores only connecting circuits and interface tools, for example, of the HP2602 HCL type mentioned above. The mother-board $CM_2$ includes a microprocessor $MP_2$ and a read-only memory (ROM) of the PROM type, namely $PROM_2$; microprocessor $MP_2$ and ROM $PROM_2$ are connected to the same internal bus BI of the microprocessor $MP_2$, itself connected to the bus $BUS_2$.

For a given application, the microprogram for the application that transfers data between peripheral OPER and the CPU resides entirely on the mother-board, inside the ROM $PROM_2$. It is activated by the microprocessor $MP_2$.

A disadvantage of this second type of coupler $CO_2$ is that each new application requires a new mother-board, since the application microprogram is stored in the non-erasable PROM memory. Moreover, since the microprogram is stored in executable form in a PROM-type memory, where access is relatively slow (150 to 200 nanoseconds), the microprocessor $MP_2$ is delayed because of the relatively long access time of the PROM memory (microprocessor access times are on the order of 100 nanoseconds). Consequently, the available power of the microprocessor is diminished.

In conclusion, the major disadvantages of the two existing types of couplers are:

limitation of the available power of the mother-boards by the microprogram stored in, and executable from, the PROM memory; and the need to change the mother-boards or the mother-board plus daughter-board assembly for each new application.

SUMMARY OF THE INVENTION

The multifunctional coupler of the invention, connected to a CPU of a computer and to a plurality of peripherals, stores at least one application microprogram that controls data transfer between the CPU and a peripheral that performs at least one application program stored in the CPU. The coupler includes a mother-board associated with at least one daughter-board, the mother-board including at least a first interface for connecting to an output bus of the CPU and a second interface for connecting to a daughter-board. The coupler also includes a control and command microprocessor that is connected to at least the first and second interfaces. The daughter-board includes an interface for connecting to a peripheral and an interface for connecting to the mother-board.

The mother-board further includes a random access memory (RAM) and a first read only memory (ROM), each connected to the output bus of the microprocessor. The daughter-board has a second ROM.

The application microprogram includes a first segment that is stored in the first ROM on the mother-board and that is common to all of the application microprograms, and a second segment that is stored in the second ROM on the daughter-board and is specific to the application being executed by the peripheral associated with the daughter-board, the second part not being rendered executable until it has been transferred to the RAM on the mother-board.

The present invention overcomes the abovementioned disadvantages by making the mother-board independent of the application from both the hardware and software standpoints, and by storing the portion of the microprogram associated with a given application in EPROM memory on the associated daughter-board. When the application is executed, the microprogram stored on the daughter-board is transferred to an SRAM on the mother-board, with the microprogram as a whole being executed at the maximum speed of the microprocessor in the SRAM memory. Thus, according to the invention, only the part of the microprogram specific to a given application is run. Thus, the invention provides a universal mother-board that can be used for all applications. Only the daughter-boards need be changed from one application to the next.

DESCRIPTION OF THE DRAWINGS

The invention will be more fully understood from the following detailed description, in conjunction with the accompanying drawings, in which.

Figure 3:
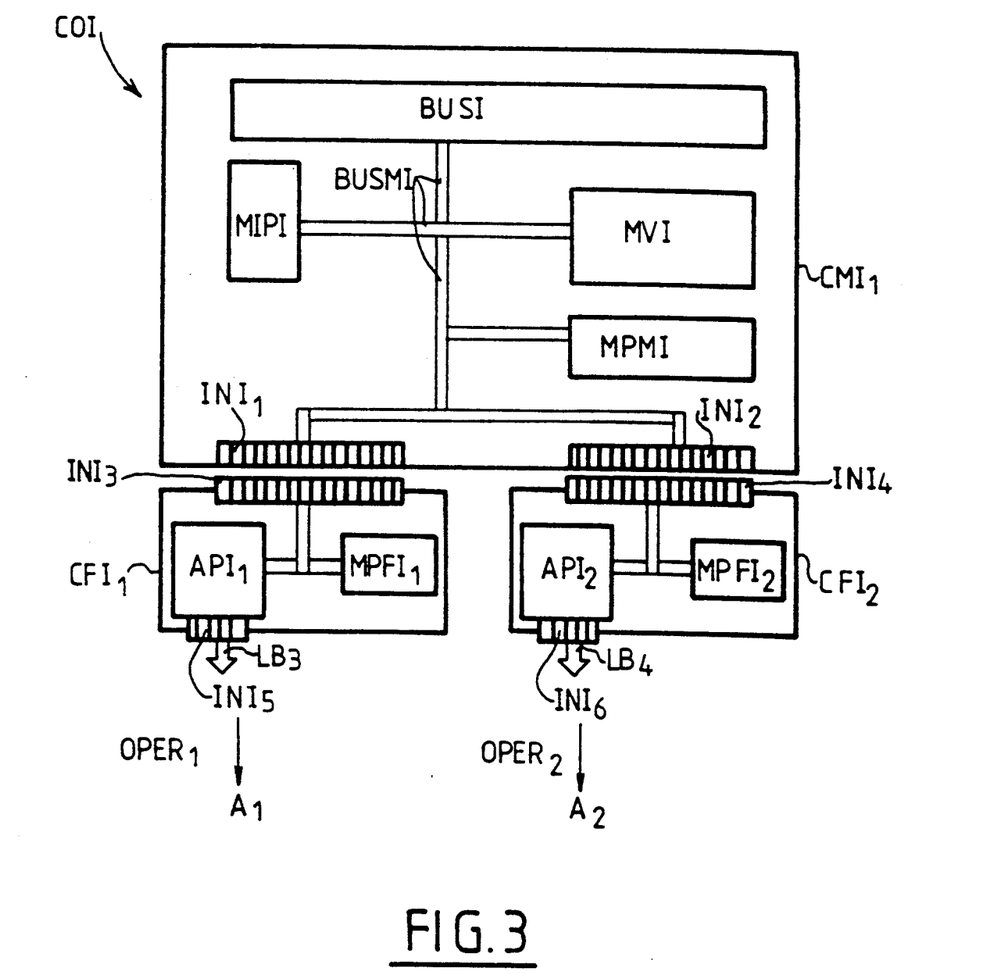
FIG. 3 is a block diagram of the coupler according to the invention.

With reference to FIG. 3, the coupler of the invention includes a mother-board $CMI_1$ and a plurality of daughter-boards $CFI_i$ associated therewith, only two being shown in FIG. 3 for the sake of simplicity, namely daughter-boards $CFI_1$ and $CFI_2$. Mother-board $CMI_1$ is connected to the CPU (not shown in FIG. 3 for the sake of simplicity) through a megabus BUSI analogous to the buses $BUS_1$ and $BUS_2$ shown in FIGS. 1 and 2, respectively. Mother-board $CMI_1$ includes a microprocessor MIPI, a RAM MVI of the SRAM type, and a reprogrammable ROM of the EPROM type, namely MPMI. In addition, the mother-board CMI has two interfaces $INI_1$ and $INI_2$ for coupling to the daughter-boards $CFI_1$ and $CFI_2$, respectively. Interfaces INI1 and $INI_2$ are analogous to interfaces $I_1$ and $I_4$ shown in FIGS. 1 and 2, respectively.

Microprocessor MIPI, RAM MVI, and EPROM MPMI are connected to the same internal bus BUSMI of microprocessor MIPI. The bus BUSMI is itself connected to megabus BUSI and to the two interfaces INI1 and $INI_2$.

The microprocessor MIPI can be implemented as a 68020, for example, made by MOTOROLA SEMICONDUCTORS, located at Colvilles Road, Kelvin Estate, East Kilbride, Glasgow, Scotland. This microprocessor is described in the technical specifications provided by its manufacturer, which states that it uses a 16.6 MHz clock.

Internal bus BUSMI of microprocessor MIPI is a 32-bit parallel bus, and data is transferred between the megabus BUSI and the daughter-boards $CFI_1$ and $CFI_2$ by direct memory access (DMA).

Figure 4:
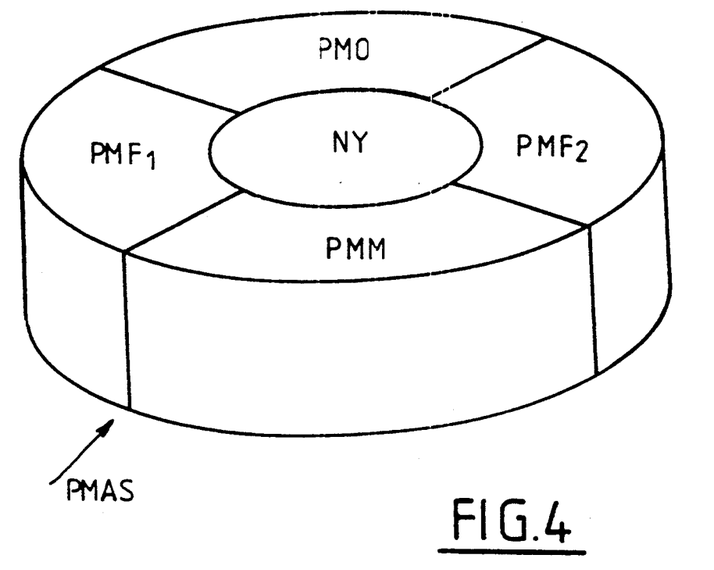
FIG. 4 is a schematic diagram of the various portions of the microprogram associated with a specific application.

The SRAM MVI has a capacity of 256 kilo-octets, organized into sixty-four 32-bit kilo-words. Referring to FIG. 4, the EPROM MPMI stores a microprogram PMM that is specific to the mother-board, a monitor checkout program PMO, and the central node NY of the microprogram whose function will be described in detail below.

Referring again to FIG. 3, the two daughter-boards $CFI_1$ and $CFI_2$ have identical structures. Daughter-board $CFI_1$ includes an application circuit $API$ and a reprogrammable EPROM-type ROM $MPFI_1$, and daughter-board $CFI_2$ includes an application circuit $API_2$ identical to circuit $API_1$ and a reprogrammable ROM $MPFI_2$ identical to $MPFI_1$. Moreover, daughter-board $CFI_1$ includes an interface $INI_3$ for connection to the mother-board $CMI_1$ and an interface $INI_5$ for connection to a peripheral OPER, and daughter-board $CFI_2$ has an interface $INI_4$ for connection to the mother-board $CMI_1$ and an interface $INI_6$ for connection to a peripheral $OPER_2$ that executes an application $A_2$. The daughter-board $CFI_1$ is connected to the peripheral $OPER_1$ by an 8-bit parallel bus $LB_3$ (analogously, $LB_4$ for $CFI_2$) that is analogous to $LB_1$ or $LB_2$. This connection can also be accomplished by, for example, a serial connection.

The interfaces $INI_3$ and $INI_5$, and $INI_4$ and $INI_6$ are analogous to the interfaces $I_2$ and $I_3$, and $I_5$ and $I_6$ shown in FIGS. 1 and 2, respectively.

Figure 5:
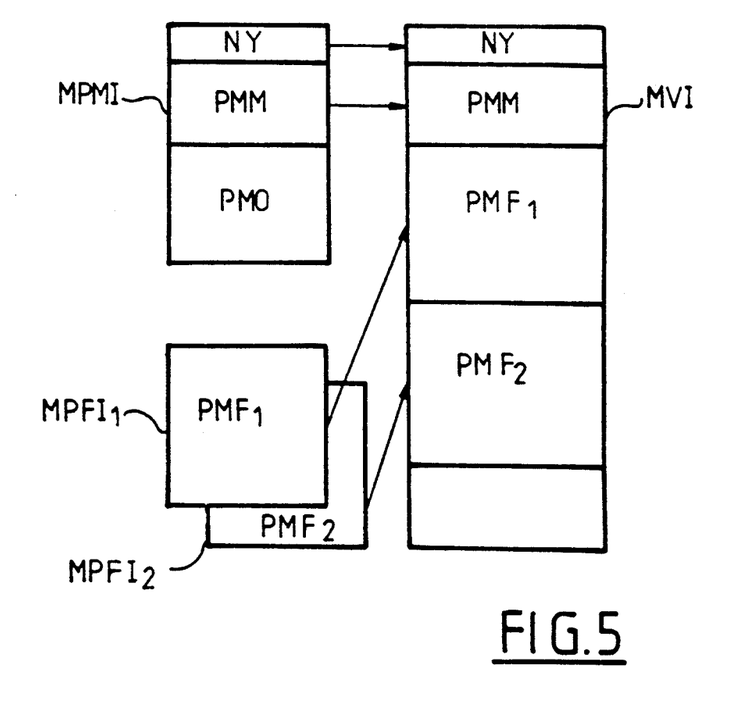
FIG. 5 is a pair of memory maps that show how each portion of the microprogram stored in memory on the daughter-board is transferred to the memory on the mother-board.

The ROMs $MPFI_1$ and $MPFI_2$ each store a microprogram $PMF_1$ and $PMF_2$, that is specific to the applications $A_1$ and $A_2$, performed by the peripherals $OPER_1$ and $OPER_2$, respectively. None of the microprograms are executable while they are resident in the respective memories $MPFI_1$ and $MPFI_2$ Therefore, the structure that permits each of the latter to be stored is less important. They can therefore be stored in an 8-, 16-, or 32-bit base, allowing considerable operating flexibility for the daughter-boards. The programs stored in the EPROMs $MPFI_1$ and $MPFI_2$ are rendered executable by loading them into the SRAM MVI on the mother-board $CMI_1$. The microprograms $PMF_1$ and $PMF_2$ that are stored in the daughter-board EPROMs are loaded under the control of the microprogram node NY. The remaining microinstructions constituting the microprograms are loaded into the same physical addresses in the various EPROMs $MPFI_1$, $MPFI_2$, ..., $MPFI_i$ on daughter-boards $CFI_1$, $CFI_2$, ..., $CFI_i$. Consequently, it is impossible to differentiate between them when they are stored on the daughter-boards, and therefore they cannot be rendered executable on the daughter-boards. The system node NY must differentiate between them after these microprograms have been loaded into the memory MVI on the mother-board. The node NY loads the microinstructions of the microprogram stored on the daughter-board at physical addresses in the EPROM MVI that are different from those into which these same microinstructions were loaded on the daughter-boards $CFI_1$ or $CFI_2$. Thus, if, for example, the microinstructions of the microprogram on board $CFI_1$ are loaded into $MPFI_1$ at addresses 1 to 100, node NY will load them, for example, into addresses 1000 to 1100 in the SRAM MVI. The microinstructions of the microprogram on board $CFI_2$ are loaded by NY into the SRAM MVI at addresses other than addresses 1000 to 1100, and that the same is true for the microinstructions of the microprograms stored on additional daughter-boards $CFI_i$. Thus, each of the microprograms stored on the daughter-boards, each representing a specific task to be executed by the system node, can only be executed when it has been loaded and installed in the SRAM MVI, as illustrated in FIG. 5.

Referring again to FIG. 4, the application microprogram PMAS organizes the transfer of information between the CPU and a peripheral $OPER_1$ or $OPER_2$ for execution of the associated application program that is stored in the central memory of the CPU. The microprogram PMAS includes a central node NY and a given number of microprogram modules PMO, PMM, $PMF_1$, and $PMF_2$. The microprogram modules $PMF_1$ and $PMF_2$ are stored in ROMs $MPFI_1$ and $MPFI_2$ on daughter-boards $CFI_1$ and $CFI_2$, respectively. The microprogram PMM is stored in the EPROM MPMI on the mother-board $CMI_1$, as is the monitor PMO.

Thus, the node NY forms the central part of the microprogram PMAS. The node NY manages the various modules PMO, PMM, $PMF_1$ and $PMF_2$, and organizes the various tasks corresponding to these microprograms. A task is the processing that corresponds to the execution of a given microprogram.

The microprogram PMAS is loaded into the SRAM MVI and is then executed in the microprocessor MIPI that contains circuits that are required to execute a set of microinstructions. The microprogram is preferably written in the C computer language.

In summary, node NY and modules PMO and PMM are written in the EPROM MPMI of the mother-board $CMI_1$, while the modules $PMF_1$ and $PMF_2$ are written in the EPROMs $MPFI_1$ and $MPFI_2$ of the respective daughter-boards.

The microcomputer module $PMF_1$ (and analogously $PMF_2$) is operative to organize data transmission from the peripheral $OPER_1$ to the mother-board by means of the application circuit $API_1$. For example, if the bus $LB_3$ is a parallel 8-bit bus, the circuit $API_1$ transforms the 8-bit format to a 32-bit format that is acceptable to the bus BUSMI and vice versa (using a set of registers associated with a multiplexing device). The application circuit $API_1$ then checks data consistency by seeking parity errors, checking the formats of each transmitted screen, and determining whether each transmitted screen is consistent with the transmission protocol associated with the peripheral $OPER_1$.

The microprogram module PMM of the mother-board $CMI_1$ does not check for consistency of the transmitted screens and the protocol and format used for transmission; this is the exclusive domain of the microprogram module $PMF_1$. By contrast, the module PMM transmits, from the daughter-boards to the CPU, data whose consistency and proper format have been verified.

The microprogram modules $PMF_1$, $PMF_2$, $PMF_i$ vary as a function of the type of associated peripheral and, for each given peripheral, vary as a function of the application to be executed by the peripheral.

Thus, we see that the role of mother-board CMI is to transmit data to the CPU, load appropriate software modules from the daughter-boards into the SRAM MVI, and then to execute the software modules under the supervision of the central node NY.

Figure 6:
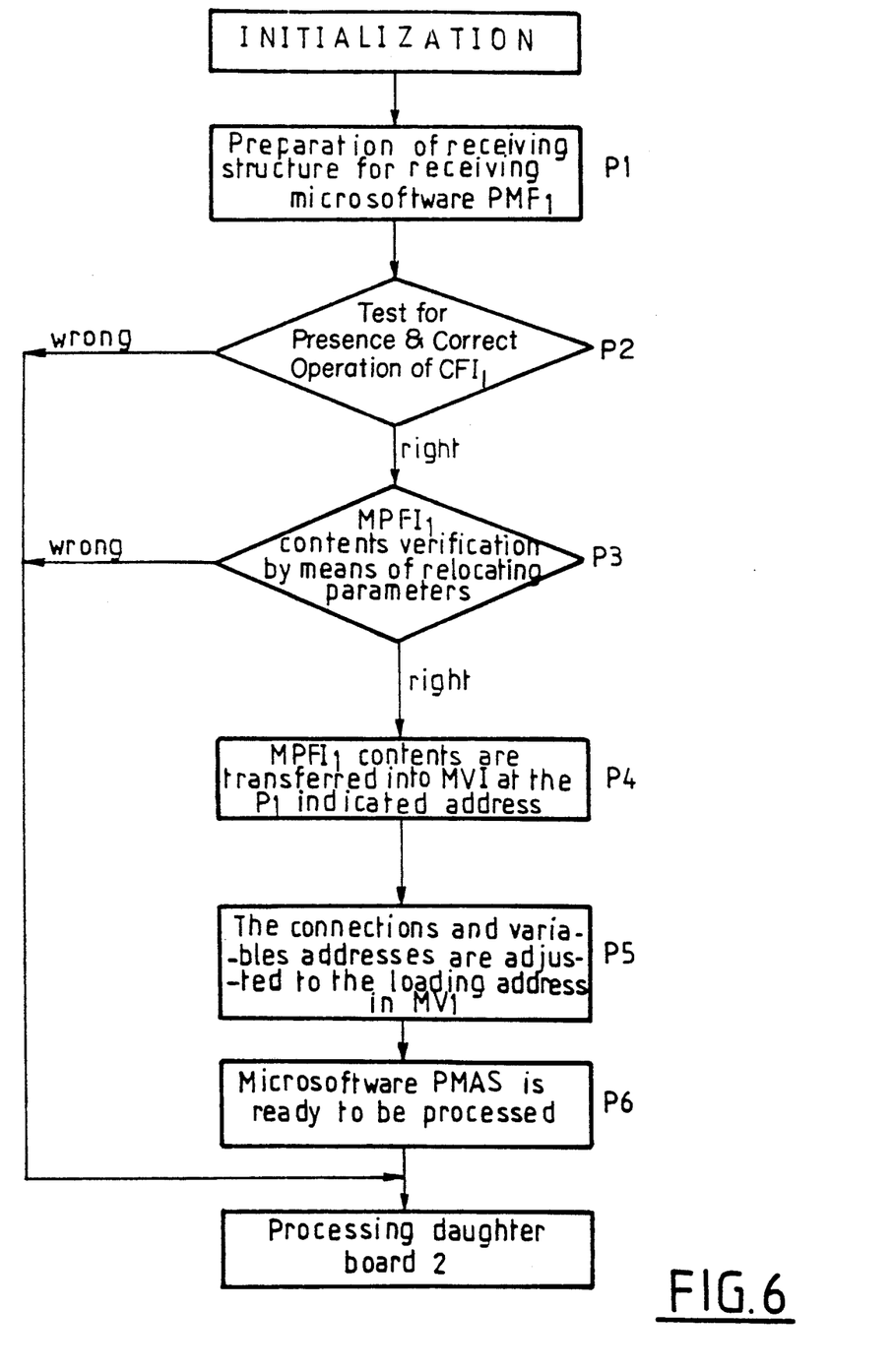
FIG. 6 is a flowchart the shows how an entire microprogram associated with an application is loaded onto a mother-board for execution.

With reference to FIG. 6, to run an application program stored in a CPU and executed by a peripheral $OPER_1$, the procedure is as follows. FIG. 6 shows the various stages in loading the microprogram PMAS into the SRAM MVI. The loading process consists of an initialization phase followed by a sequence of six successive phases for loading microprogram modules such as $PMF_1$, $PMF_2$, etc..

A. Initialization

First, the mother-board is initialized by the microprocessor MIPI and then, after running the usual tests of correct functioning of the various elements of the mother-board, the system node NY is loaded into the SRAM MVI; the node NY is then run. The node NY then searches for the module PMM stored in the EPROM MPMI on the mother-board $CMI_1$, and transfers it to the SRAM MVI. Ideally, it also searches for the monitor PMO and transfers it to the SRAM MVI.

The monitor is a microprogram for checking other programs that enable it to display, to modify SRAM memory and the microprocessor registers, to stop the execution of a program at a selected address, and to start it again. The monitor program practically never intervenes when the microprogram PMAS is running. In fact, the monitor does not organize work during an application but merely supervises the execution of the various tasks in the microprogram PMAS, namely NY, PMM, and $PMF_1$.

B. Loading Microprogram $PMF_1$ into the SRAM MVI

This loading process requires six successive phases as follows:

Phase $P_1$: This phase prepares the acceptance structure to receive the microprogram $PMF_1$. Phase P1 prepares the SRAM MVI to receive the microprogram $PMF_1$, i.e., it zeroes the memory locations that are to receive the microprogram $PMF_1$, and indicates the associated memory addresses allocated to this program.

Phase $P_2$: Phase P2 is a presence test and a test of the correct operation of the daughter-board CFI, for example. Phase P2 ensures that the daughter-board $CFI_1$ is connected to the mother-board, and that the daughter-board is functioning correctly, using a special bit at the level of the interface $INI_1$ whose value indicates whether the daughter-board is functioning correctly. Phase P2 can also employ a different signal to indicate that the peripheral $OPER_1$ is actually connected and that it can execute the application in question. This bit, sent to the microprocessor MIPI, is interpreted by the microprocessor MIPI. If the value is correct, the microprocessor MIPI moves on to the next operation, $P_3$. If the value is not correct, the microprocessor MIPI proceeds to load the microprogram on the daughter-board $CFI_2$.

Phase $P_3$: In Phase P3 there is verification of the contents of the memory $MPFI_1$ on the daughter-board $CFI_1$. During this verification process, the first bits are analyzed in the memory area where the microinstructions of the microprogram stored in the daughter-board $CFI_1$ are written. These first bits provide, for example, the name of the microprogram module $PMF_1$ for identifying the kind of application program to be executed, the dates the microprogram was written and last updated, the size of the module $PMF_1$, and the number of relocating parameters of the module $PMF_1$. It also checks whether the relocating parameters are in fact present. The relocating parameters are those that make it possible to shift the microprogram stored on the daughter-board as a block to the SRAM MVI by appropriately changing the digital addresses stored in the instructions. Thus, if the various microinstructions stored in the microprogram on the daughter-board $CFI_1$ are written to addresses such as 1, 2, 3, ..., j, for example, these same microinstructions will be stored in the memory areas of SRAM MVI that hold addresses j+k. The relocation parameters therefore consist of a label that indicates the name of the microinstruction and an address j where this microinstruction is stored in the memory $MPFI_1$ of the daughter-board $CFI_1$. The relocation parameters indicate the address j in the memory $MPFI_1$ whose value must be changed to a value j+k in the SRAM MVI. The value to be added to k is indicated by a microinstruction stored in the node NY.

In summary, verification of the contents of the memory $MPFI_1$ involves reading at the beginning of the memory area where program pMFI is written, a series of bits indicating that the memory $MPFI_1$ has already been written to. If this verification turns out positive, the next phase $P_4$ follows; if not, the microprogram is loaded directly from board $CFI_2$, as illustrated in FIG. 6.

Phase $P_4$: At this phase, microprogram $PMF_1$ is transferred into the SRAM MVI at the addresses provided in Phase $P_1$.

Phase P₅: This phase involves changing the address branches of the microprogram on the daughter-board, and those of the variables stored in the microprogram, to new loading addresses in the SRAM MVI. In this operation, the microprocessor MIPI reads the relocation parameters and, for each of them, adds the quantity k to the indicated address j k being the value to be added to address j to obtain the new address j+k where the corresponding microinstruction will be located into the SRAM MVI. Operation P₅ therefore renders the microprogram that was transferred from the EPROM MPFI₁ to the SRAM MVI on the mother-board CMI₁ executable within the SRAM MVI. When operation P₅ is completed, operation P₆ follows.

Phase P₆: The microprogram PMAS is now ready to be executed. Execution takes place at a moment selected by the computer CPU when it is ready to execute the application program used by the peripheral OPER1, for example. As soon as the microprogram PMF₁ has been executed, the microprogram PMF₂ is then loaded into the SRAM MVI from the daughter-board CFI₂, or from any similar daughter-board.

Other modifications and implementations will occur to those skilled in the art without departing from the spirit and scope of the invention as claimed. Accordingly, the above description is not intended to limit the invention except as indicated in the following claims.

What is claimed is:

1. A multifunctional coupler for connecting a computer central processing unit (CPU) and a plurality of peripherals, for storing at least one application microprogram, each application program operative to control a transfer of data between a peripheral and the CPU, and for executing each of the at least one application microprograms, the coupler comprising:
    a mother-board coupled to at least one daughter-board, the mother-board including:
        at least one daughter interface connected to an output bus of the central processing unit;
        a control and command microprocessor connected to each of the at least one daughter interfaces;
        a random access memory connected to an output bus of said microprocessor; and
        a first read-only memory connected to said output bus of said microprocessor, said first read-only memory for storing a first application program segment that is common to each of the at least one application microprograms stored in the multifunctional coupler; and
    each daughter-board including:
        a second read-only memory for storing a second application program segment of a first one of the at least one application microprograms wherein the second application program segment is for controlling a peripheral connected to the respective daughter-board, and wherein the second application program segment is not executable until it is transferred to said random access memory of said mother-board;
        a peripheral interface, connected to said second read-only memory, for connection to a peripheral; and
        a mother interface, connected to said second read-only memory, for connection to said mother board;
    wherein said control and command microprocessor includes a transfer means for transferring the second application program segment of the first one of the at least one application microprograms from said second read-only memory to said random access memory of said mother-board;
    wherein said transfer means comprises means for shifting addresses of the application microprogram in the second read-only memory so as to render the application microprogram executable in the random access memory; and
    means for executing the application microprogram by the CPU after the application microprogram is rendered executable in the random access memory.

2. The coupler of claim 1 wherein said first and second ROMs are erasable programmable ROMs.

3. The coupler of claim 1 wherein said daughter-board further comprises:
    an application circuit, connected to said mother interface and to said peripheral interface, said application circuit including:
    parity checking circuitry;
    screen format checking circuitry; and
    protocol consistency-checking circuitry, cooperative with said parity checking circuitry and said screen format checking circuitry,
    said application circuit ensuring transmission of information from a peripheral to said mother-board by performing parity checking, screen format checking, and protocol consistency checking.

4. The coupler of claim 1 wherein the application microprogram includes a node microprogram for loading other microprograms, and wherein said node microprogram is stored in said first ROM.

5. A method of operating a multifunctional coupler for coupling a CPU to a plurality of peripherals, the coupler including a mother-board and a plurality of daughter-boards wherein the mother-board includes a control and command microprocessor, a random access memory, and a first read-only memory for storing a first segment of an application microprogram, the first segment being common to each of a plurality of application microprograms for controlling a corresponding plurality of peripherals, wherein each of the daughter-boards includes a second read-only memory for storing a second segment of the application microprogram for controlling a peripheral coupled to each of the daughter-boards wherein the method comprises the steps of:
    (a) loading a node microprogram of an application microprogram corresponding to a selected peripheral into the random access memory of the mother-board by the control and command microprocessor;
    (b) under control of the node microprogram, loading the first segment of the application microprogram into the random access memory of the mother-board by the control and command microprocessor;
    (c) under control of the node microprogram, loading a second segment of the application microprogram from a second read-only memory of a daughter-board into the random access memory of the mother-board, by the control and command microprocessor wherein the step of loading the second segment of the application microprogram includes the steps of:
        (i) preparing the random access memory of the mother-board to receive the second segment of the application microprogram from a second read-only memory;

(ii) testing for the presence and correct operation of a first daughter-board of said plurality of daughter-boards;

(iii) if the testing step indicates that the first daughter-board is not present or is not correctly operating, loading the application microprogram from an alternate daughter-board;

(iv) in response to the testing step indicating that the first daughter-board is present and that the first daughter-board is operating correctly, verifying the contents of the second read-only memory on the first daughter-board, wherein the verifying step includes the step of verifying relocation parameters stored in the second read-only memory of the first daughter-board, and if the step of verifying fails, loading the application microprogram from an alternate daughter-board, and if the step of verifying does not fail transferring the contents of the second read-only memory on said first daughter-board into the random access memory of the mother-board;

(v) shifting addresses of the application microprogram int he second read-only memory of the first daughter-board so as to render the application microprogram executable in the random access memory of the mother-board; and (vi) loading the addresses provided in the shifting step from the read-only memory of the first daughter-board to the random access memory of the mother-board; and (d) executing the application microprogram by the CPU.

6. The method of claim 5 wherein the step of preparing the RAM includes the steps of:

zeroing a plurality of memory locations in the RAM;

receiving the second segment of the application microprogram from the second ROM into the RAM; and indicating associated memory addresses int he RAM allocated to the second segment.

7. The method of claim 5 wherein the step of transferring the contents of the second ROM into the RAM takes place at the associated memory addresses.

* * * * *

UNITED STATES PATENT AND TRADEMARK OFFICE
CERTIFICATE OF CORRECTION

PATENT NO. : 5,274,765
DATED : December 28, 1993
INVENTOR(S) : Remy Le Gallo

It is certified that error appears in the above-indentified patent and that said Letters Patent is hereby corrected as shown below:

Column 2, line 34, "coupler CO" should read --coupler $CO_1$--.

Column 2, line 49, "$CO_1$," should read --$CO_i$,--.

Column 3, line 43, "I" should read --$I_1$--.

Column 5, line 26, "CMI" should read --$CMI_1$--.

Column 5, line 28, "INI1" should read --$INI_1$--.

Column 5, line 34, "INI1" should read --$INI_1$--.

Column 5, line 56, "API" should read --$API_1$--.

Column 5, line 63, "OPER" should read --$OPER_1$--.

Column 7, line 33, "$PMF_1$, $PMF_2$, $PMF_i$" should read --$PMF_1$, $PMF_2$, ..., $PMF_i$--.

Column 7, line 58, "CMI:," should read --$CMI_1$,--

Column 8, line 14, "CFI" should read --$CFI_1$--.

Column 8, line 60, "pMFI" should read --$PMF_1$--.

UNITED STATES PATENT AND TRADEMARK OFFICE
CERTIFICATE OF CORRECTION

PATENT NO. : 5,274,765
DATED : December 28, 1993
INVENTOR(S) : Remy Le Gallo

It is certified that error appears in the above-indentified patent and that said Letters Patent is hereby corrected as shown below:

Column 9, line 1, "address branches" should read --addresses of the branches--.

Column 9, line 7, "address jk" should read --address j, k--.

Column 9, line 18, "OPER1" should read --$OPER_1$--.

Column 10, line 20, "parity checking circuitry;" should read --a parity checking circuit;--.

Column 10, line 21, "screen format checking circuitry;" should read --a screen format checking circuit,--.

Column 10, line 22, "protocol consistency-checking circuitry" should read --a protocol consistency-checking circuit--.

Column 10, line 23, "circuitry" should read --circuit--.

Column 10, line 24, "circuitry" should read --circuit--.

UNITED STATES PATENT AND TRADEMARK OFFICE
CERTIFICATE OF CORRECTION

PATENT NO. : 5,274,765
DATED : December 28, 1993
INVENTOR(S) : Remy Le Gallo

It is certified that error appears in the above-indentified patent and that said Letters Patent is hereby corrected as shown below:

Column 12, line 18, "int he RAM" should read --in the RAM--.

Signed and Sealed this

Thirtieth Day of August, 1994

Attest:

BRUCE LEHMAN

*Attesting Officer*            *Commissioner of Patents and Trademarks*